United States Patent [19]

Davie et al.

[11] Patent Number: 4,668,387

[45] Date of Patent: May 26, 1987

[54] DEEP SUBMERGENCE ROTATING BIOLOGICAL CONTACTOR APPARATUS

[75] Inventors: Richard L. Davie, Oconomowoc; Donald N. Gass, Brown Deer, both of Wis.

[73] Assignee: Envirex Inc., Waukesha, Wis.

[21] Appl. No.: 778,939

[22] Filed: Sep. 23, 1985

[51] Int. Cl.⁴ .............................................. C02F 3/08
[52] U.S. Cl. .................................. 210/150; 210/199; 261/92
[58] Field of Search ............... 210/619, 150, 151, 199, 210/205, 220, 219; 261/91-93

[56] References Cited

U.S. PATENT DOCUMENTS

| | | | |
|---|---|---|---|
| 650,063 | 5/1900 | Kersten et al. | |
| 3,704,783 | 12/1972 | Antonie | 210/151 |
| 3,886,074 | 5/1975 | Prosser | 210/150 |
| 4,093,539 | 6/1978 | Guarino | 210/150 X |
| 4,160,736 | 7/1979 | Prosser | 210/150 |
| 4,284,503 | 8/1981 | Stahler | 210/150 |
| 4,330,408 | 5/1982 | McClure | 210/150 X |

FOREIGN PATENT DOCUMENTS 53-82265  2/1978  Japan.
56-73596  6/1981  Japan.

*Primary Examiner*—Tom Wyse
*Attorney, Agent, or Firm*—Lawrence J. Crain

[57] ABSTRACT

A wastewater treatment apparatus is disclosed in which a rotating biological contactor rotatably mounted on a horizontal shaft is deeply submerged in a wastewater tank, so that a substantial portion of attached biomass does not come into contact with the ambient air. A plurality of gas conduits are disposed in the tank beneath the rotating contactor and are positioned to provide rotational energy to the contactor, to serve as the principal source of oxygen for the submerged biomass and to regulate the rotational velocity of the biological contactor so that the oxygen containing air bubbles are caused to rise into the central region of media rather than being swept along and confined to the outer radius of the media as it rotates.

18 Claims, 9 Drawing Figures

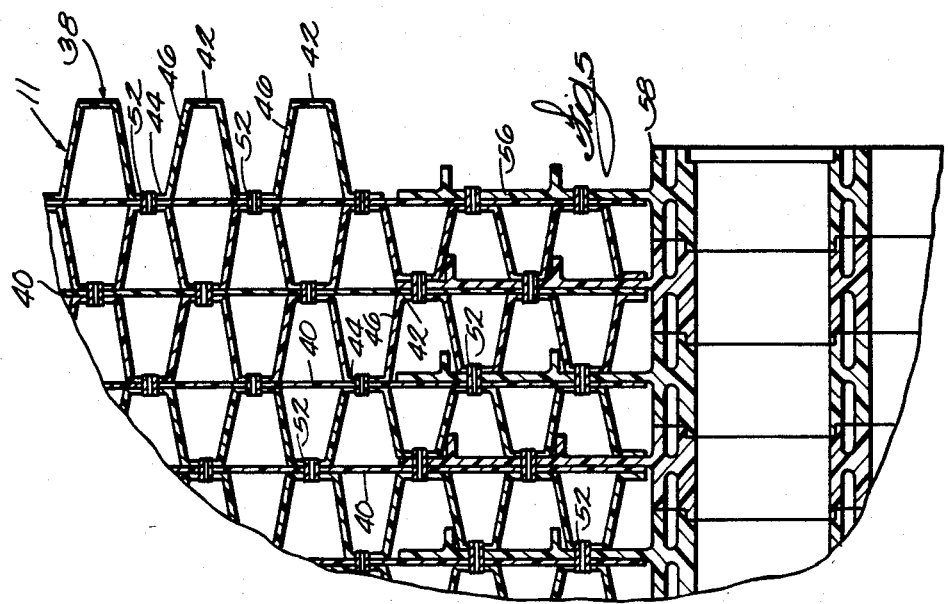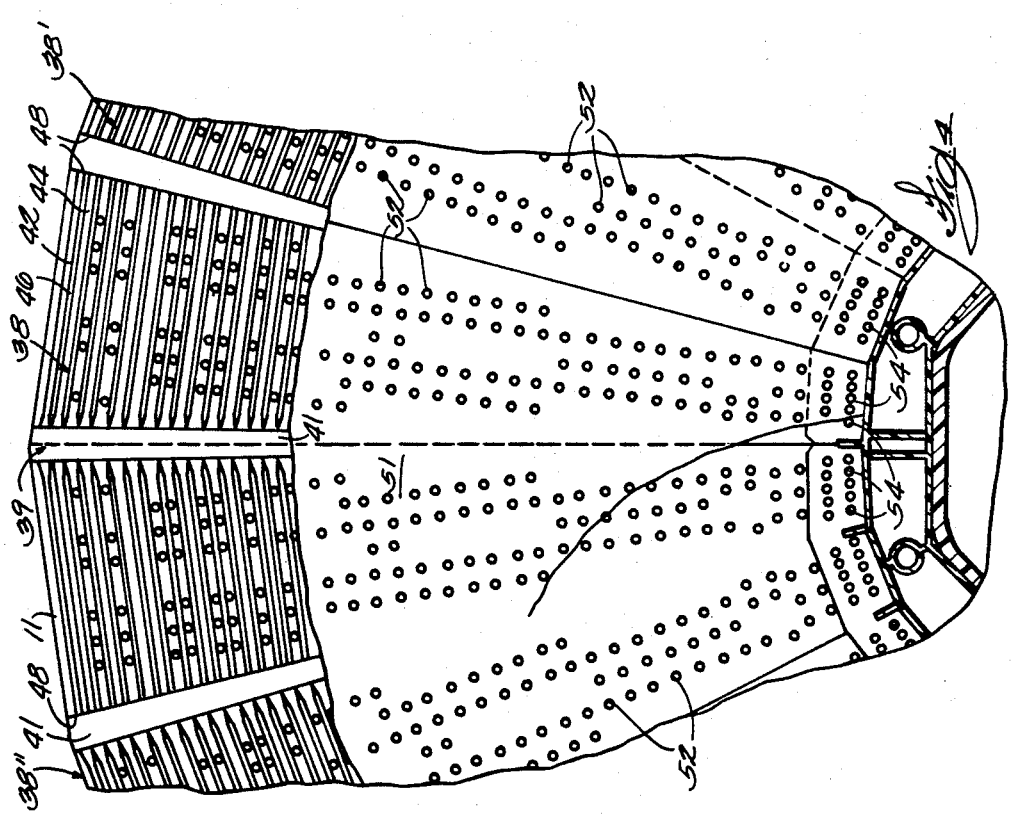

DEEP SUBMERGENCE ROTATING BIOLOGICAL CONTACTOR APPARATUS

BACKGROUND OF THE INVENTION

This invention relates to the biological treatment of wastewater, and more particularly to an improved form of rotating biological contactor. Rotating biological contactors (RBC) generally comprise a cylindrical framework with a labyrinthine interior media designed to provide extensive air/water contact surfaces. The cylinder rotates about a horizontal axis in a secondary wastewater treatment tank. RBCs provide surfaces for the growth of a biomass which has the ability to adsorb, absorb, coagulate and oxidize undesirable organic constituents of the wastewater and to change them into unobjectionable forms of matter. The contactors are typically rotated partially submerged in a wastewater treatment tank so that the surfaces are alternately exposed to the wastewater and to oxygen in the ambient air. Organisms in the biomass remove dissolved oxygen and organic materials from the film of wastewater. Unused dissolved oxygen in the wastewater film is mixed with the contents of the mixed liquor in the tank.

It has been common to drive the contactors by use of a motor, usually electric, connected through a reduction gearing to the horizontal shaft upon which the contactor rotates. The amount of force required to rotate the RBC is critical, for the biomass has a tendency to accumulate on the myriad surfaces of the contactor media to such an extent that a significant supplemental load is placed on the contactor structure, shaft and bearings, thus impeding the rotation of the device and exerting the major structural load on the RBC apparatus.

This process of biomass loading is accentuated as the diameter of the contactor increases. It is now common practice to install RBCs having diameters on the order of twelve feet.

Increased diameter RBCs are capable of substantially reducing manufacturing and installation costs, provided the structural loads do not become excessive. One way of reducing biomass loading is through the use of supplemental aeration which provides additional control of the thickness and the type of biomass which grows on the RBC surface.

Supplemental aeration may serve a dual purpose, for U.S. Pat. No. 3,886,074 to Prosser teaches the use of air capture devices mounted on the media to capture some of the supplemental air and cause the RBC to rotate. This apparatus eliminates the need for a direct electrical or mechanical drive system to be applied to rotate each RBC as is conventional practice. One disadvantage of the use of air capture devices when applied to conventional submergence RBCs (those having 40-50% submergence), is the need for excessive amounts of air to maintain rotation once the biomass grows in an uneven fashion, thus causing substantial structural imbalance. For the purposes of this application, "percent submergence" refers to the amount of submerged media surface area.

Further, it takes substantial energy to rotate a loaded RBC when immersed only 40-50% in the wastewater due to the significant amount of wastewater which is drawn into the air, plus the additional drag imposed by the air capture devices mounted to the media periphery as they reenter the wastewater. The air capture devices disclosed by Prosser are purposely designed to trap air in order to rotate the RBC unit. A disadvantage of this construction is that as a specific point on the RBC unit rotates through the air and begins to descend into the water, the design of the air capture device creates a drag on the rotational velocity of the RBC.

A still further consideration of RBC construction is that RBCs are often used to increase the efficiency of existing primary or secondary (activated) sludge sewage treatment plants. This is accomplished by installing conventional RBCs, typically 11-12 feet in diameter, in the existing clarifier and/or aeration tanks. Since these tanks may normally be 10-20 feet in liquid depth, conventional RBCs at normal 40% submergence require substantial modification to the existing tanks. Usually a new tank bottom is required at a higher elevation located only 5-7 feet below the top of the tank and just below the RBC media.

This method, while currently a cost effective method to upgrade plant capacity and performance, has the disadvantage that the entire tank volume cannot be used effectively and requires substantial construction costs to provide the new false bottom.

U.S. Pat. No. 3,704,783 to Antonie discloses the use of a combination of partially and totally submerged RBCs to aerate a secondary treatment tank. The Antonie system includes partially submerged RBCs which provide a supply of aerated water to the totally submerged RBCs. Subsequent practice has shown that this method of adding dissolved oxygen to the wastewater is not sufficient to permit submerged media surfaces to function aerobically. A further means to reduce flow velocity and induce mixing and turbulence within the submerged media is necessary to maintain aerobic conditions.

Thus, there is a need for an RBC apparatus which provides for the deep submergence of larger diameter RBC units into both new and upgraded secondary treatment tanks so that a substantial amount of the contained water is treated by the RBC, the attached RBC biomass receives sufficient oxygen and a minimal amount of energy is required to aerate and rotate the RBC.

It is therefore an object of the present invention to provide a large diameter, deep submergence RBC apparatus.

It is another object of the present invention to provide a deep submergence RBC apparatus which can be installed in existing tankage without extensive modifications.

It is a further object of the present invention to provide a large diameter, deep submergence RBC apparatus which does not require elaborate drive means.

It is a still further object of the present invention to provide a large diameter, deep submergence RBC apparatus which provides for adequate aeration, mixing and thickness control for an attached, constantly submerged biomass, and a means of providing control of rotational velocity.

SUMMARY OF THE INVENTION

A deep submergence rotating biological contactor apparatus is provided in which the totally submerged biota are provided with adequate aeration through a uniquely positioned aeration device. The same pressurized gas which supplies oxygen and maintains generally aerobic conditions within the submerged media also provides means of adjustment to the rotational velocity of the RBC unit.

More specifically, the RBC of the present invention may be submerged on the order of from 70–100%. The substantial decrease in required rotational energy obtained through increased submergence allows the RBC unit to be easily driven by a motor or by the flow of pressurized oxygen containing gas emanating from perforated gas conduits located in the tank beneath the RBC unit. Efficient aeration is provided by at least one gas conduit positioned so that rising gas bubbles have sufficient time and vertical movement to penetrate the innermost regions of the constantly submerged portion of the media. Gas conduits may be provided on either side of the longitudinal axis of the RBC unit in a counteracting arrangement to adjust the rotational velocity while providing enough supplemental oxygen and mixing to ensure the aerobic conditions and control the thickness of biomass attached to the submerged media.

BRIEF DESCRIPTION OF THE DRAWINGS

The present invention and its many attendant objects and advantages will become better understood by reference to the following drawings, wherein.

FIG. 4 is an enlarged front view in elevation and in partial section of a portion of the contactor of FIG. 1 with areas broken away for purposes of illustration;

FIG. 5 is a view in vertical section through the contactor and taken in the plane of the line A—A of FIG. 1;

DESCRIPTION OF THE PREFERRED EMBODIMENT

Figure 1:
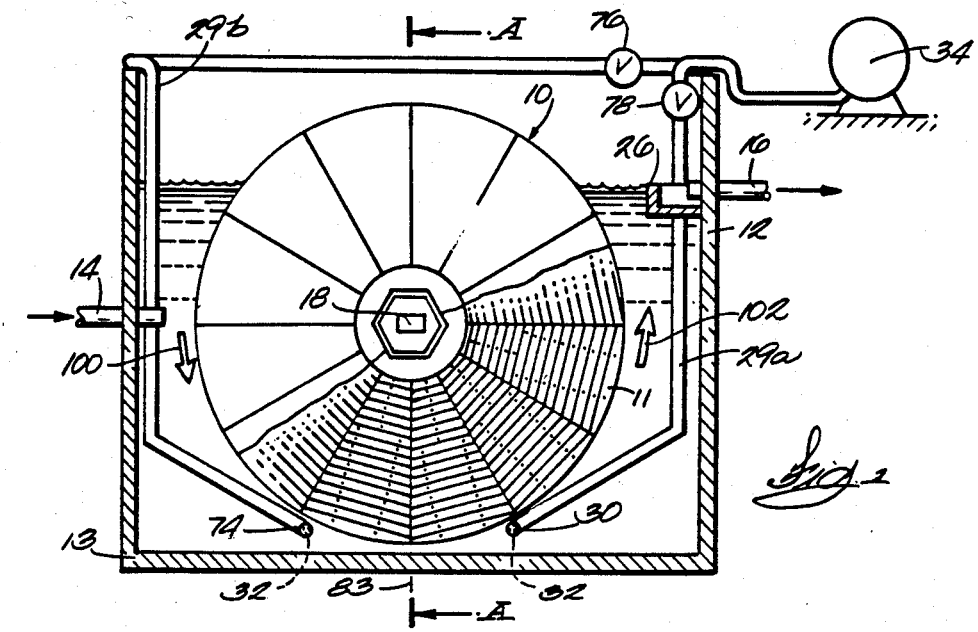
FIG. 1 is a cross-sectional view of a portion of an aeration tank incorporating the invention.

Referring now to the drawings, wherein like reference characters designate identical or corresponding parts, FIG. 1 shows a rotating biological contactor (RBC) 10 comprised of a labyrinthine media 11 and mounted deeply submerged in the wastewater held in a treatment tank 12 having a bottom 13, an inlet 14 and an outlet 16. In the preferred embodiment, approximately 70–100% of the RBC is submerged. The RBC media 11 is supported on a central shaft 18 which is polygonal in cross-section and which rotates in bearings (not shown) supported in or near the side wall of the treatment tank 12. Although FIG. 1 depicts only one RBC unit in a tank 12, in practice one tank will often contain a plurality of RBCs employed in a series arrangement (see FIG. 3).

At least one rotational gas conduit 30 extends along the width of the tank 12 beneath the bottom of the tank 13 and the contactor assembly 10. The preferred configuration of conduit 30 is essentially a cylindrical tube which is provided with a series of orifices 32 spatially arranged along its underside to prevent clogging. Other conventional diffuser configurations are acceptable. The conduit 30 is mounted in tank 12 offset from a vertical plane through the center line 83 of RBC 10. The optimum position of gas conduit 30 is discussed in further detail below.

The rotational gas conduit 30 is connected to gas line 29a which leads from a source of air or other oxygen containing gas under pressure such as a pressure blower 34 driven by a motor (not shown).

In operation, wastewater enters tank 12 through inlet 14. Wastewater is then drawn by the rotation of RBC 10 into media 11, which is rotated by pressurized air emanating from gas conduit 30. Biota within the media absorbs and digests impurities from the wastewater. Treated water will then flow over a weir 26 and out of an outlet pipe 16 disposed at the opposite end of tank 12.

It has been found experimentally that as the RBC media 11 is immersed deeper in the wastewater (greater than 50% submergence), the energy required to rotate the media is reduced dramatically. This is not obvious since it might be expected that required rotational energy would increase due to increased media exposed to the frictional drag forces encountered when rotating through wastewater. As an example of this unexpected finding, studies have shown that at 80% submergence the energy required to rotate at 1.0 RPM is 60% of the requirement at 40% submergence. When fully submerged, rotational energy may be as low as 40% of that required at 40% submergence.

Thus, when an RBC is submerged in the wastewater or fluid media from 60–100% of its surface area, it is possible to reduce or eliminate the specific air capture devices as taught by Prosser and still cause the RBC media to rotate at any acceptable velocity by discharging low pressure air beneath the media via conduit 30. In this case, because of the reduced energy required for rotation, it has been found that the natural effect of buoyancy and fluid friction caused by rising air bubbles is sufficient to force the media to rotate at a reasonable velocity.

As the RBC media is immersed beyond about 60% in the wastewater, a portion of the media surface area is rotated through the air and a substantial portion of the media is constantly submerged in the wastewater. For example, for a 16 foot diameter media operated at 80% submergence, approximately 60% of the media is exposed to the air during the course of one RBC revolution. Thus, 40% of the active media is at all times submerged. Obviously, at 100% submergence, none of the media is exposed directly to atmospheric air.

Deep submergence of the RBC media makes it necessary to use supplemental aeration to provide adequate mixing, biofilm flushing and to furnish the necessary supply of oxygen to the fully submerged biomass in order to maintain fully aerobic operating conditions. Consequently, the present invention employs supplemental aeration to both support the aerobic biological treatment process and at the same time cause the media to rotate when the RBC is submerged at least 60%.

While the system can be made to work even when 100% submerged, the more ideal condition is in the range from 60–95% submergence, where a significant portion of the media still rotates through atmospheric air. As an example, at 90% submergence, over 45% of the media still rotates through the air.

At this level of submergence, since exposure to the air provides essentially free oxygen to the approximate 40% of the biomass which is exposed, only 60% of the biomass requires oxygen from the supplemental air discharged beneath the media. This suggests that there is an optimum operating condition at some point between 60% and 100% media submergence which results in a minimum energy requirement to operate the process. In other words, as submergence increases, at some point the reduction in required rotational energy will be offset by increased aeration requirements. This optimum condition will vary somewhat with the particular application.

A further advantage of the deeper submergence RBC is due to the reduction in structural load imposed on the RBC apparatus. As an example, at approximately 80% submergence, an 18 foot diameter RBC will carry only 50% of the structural load caused by biomass and media in the air as carried by a 12 foot diameter unit operating at the normal 40% submergence level. At the same time, the 18 foot diameter unit is able to carry nearly 80% more effective surface area to treat wastewater than the 12 foot diameter unit using essentially the same media configuration and media spacing. This results in a significant reduction in the cost of manufacture of the RBC apparatus per unit of surface area and further permits the use of current media and media support structure without the attendant need to add additional structural elements to the apparatus.

Thus, it is seen that the combined use of increased or total submergence, larger diameters and supplemental aeration of RBC media can be combined to substantially decrease installation and operating costs.

Figures 2A, 2B:
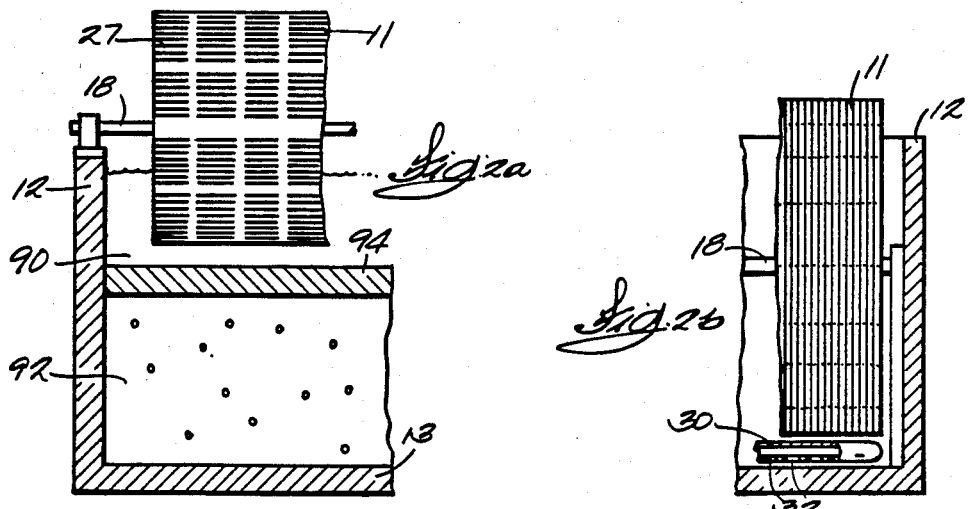
FIG. 2a is sectional view of an existing wastewater treatment tank showing the conventional installation of an RBC using a false bottom.
FIG. 2b is a sectional view of an existing wastewater treatment tank wherein the present invention has been installed.

Referring now to FIGS. 2a and 2b, an additional advantage of the deep submergence RBC of the present invention is shown. When existing secondary treatment tanks are converted to conventional submergence RBC tanks, a false floor 90 must be constructed to ensure that all the water to be treated has a chance to come in contact with the RBC. This floor 90 is constructed by filling the existing tank with a bed of gravel 92, which is then covered by a layer of concrete 94. If the false floor is not provided, water near the tank bottom 13 is not aerated and remains stagnant. Anaerobic conditions may easily develop, producing unwanted septic odors and reducing overall performance of the process.

The construction of this false bottom 90 significantly increases the cost of upgrading facilities to meet more stringent water quality standards.

In contrast, FIG. 2b shows how the deep submergence RBC of the present invention may be mounted in a conventional tank with a minimum amount of reconstruction since a false floor 90 is not required. At the same time, the deeply submerged RBC of the present invention is able to use substantially the entire capacity of the tank, greatly increasing the treatment capacity of the plant. For comparison purposes, RBC media 11 in FIG. 2a is shown having air capture devices 27 while the corresponding media in FIG. 2b is shown without air capture devices.

Figure 3:
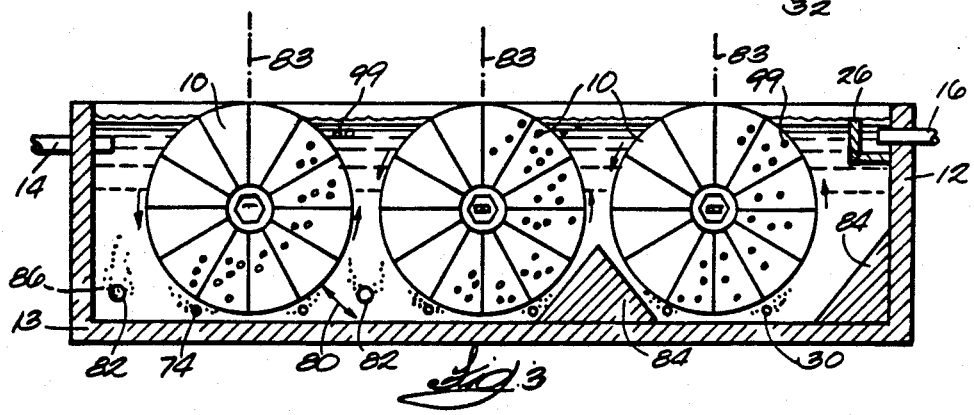
FIG. 3 is a side view in partial section of a wastewater treatment tank embodying the present invention and having various means to ensure adequate aeration of all areas of the tank.

Referring now to FIG. 3, as RBC diameter increases and RBC units are installed in the usual manner with multiple units arrayed in a series fashion in a long tank, the clearance 80 between the media surface and portions of tank bottom 13 becomes substantial. Since the tank bottom 13 is normally flat and not contoured in any way, it is likely that suspended solids in the mixed liquor could settle and accumulate in these relatively stagnant areas. This is seldom a problem with conventional sized RBCs since there is still enough turbulence induced in shallower tanks to keep solids in suspension. Should an accumulation of settled solids occur in these areas, this will have an adverse effect on the overall biological performance of the system. Water in these uncirculated areas may become anaerobic and ultimately septic.

There are two practical means by which the wastewater in these zones can be maintained in a sufficient state of turbulence to prevent solids from settling. One method of alleviating this problem is the insertion of a supplemental conduit 82 extending the width of the tank and discharging a small amount of air in the form of coarse bubbles through slots 86. This conduit 82 would extend the width of the tank and would be mounted approximately midway between the center lines 83 of each RBC unit and between the first and last RBC unit and the wall of tank 12. Air from this supplemental gas conduit will be sufficient to maintain the necessary turbulence to prevent the settling of solids. Supplemental conduit 82 may be connected to gas conduit 29.

In lieu of aeration, a rising fillet 84 may be installed or formed at the tank bottom to induce sufficient turbulence and to bring the surface closer to the RBC media. With the addition of fillet 84, turbulence induced by the rotating RBC effectively prevents the accumulation of solids.

FIGS. 4, 5, 6 and 7 depict the construction of the RBC media 11 used in the preferred embodiment. This description is offered principally for purposes of explanation, since any one of a number of RBC media configurations may be used. A thin wall contactor media 11 is built from a series of formed 38 and flat 40 sector sheets which in the preferred embodiment each occupy a sector of about 30° to 45° of the total circumference of RBC 10. Referring to FIG. 4, the formed sector sheets 38 have a central radial wall portion 51 which is of increasing width in the direction of the perimeter of the formed sheet 38. The formed sector sheets 38 have a series of corrugations formed on either side of the central flat portion 41 and the correct corrugation define alternating peaks 42 and valleys 44 connected by sloping side wall 46. The corrugations are oriented tangentially to circles drawn at the axis of the RBC. The corrugations extend both above and below the plane of the central flat portion and terminate at the radial edges 48 of formed section 38. The arc described by each formed sector 38 is less than 30° so that radial edges 48 of identical side by side sectors 38, 38′, and 38″ are spaced apart as shown in FIG. 4. The central flat portion 41, and the spaces between the adjacent form sectors, such as sectors 38, 38′, and 38″ both define radial passages 39 for the entry of wastewater into the corrugations.

The formed sector sheets 38 are alternated with flat sector sheets 40 which span a sector on the order of 30° and which complete the radial passages at the edges of the formed sectors 38 and at the flat central portions 41. Both the formed sectors 38 and the flat sectors 40 are preferably formed from a thermal plastic resin such as polyethelene. The sectors are formed from thin sheet material having a thickness in the range of 0.02 to 0.03 inches. The formed sectors 38 are given their configuration by vacuum forming. In the preferred embodiment, the sectors are joined to each other by welding using heated needles or pins which melt the material and fuse together adjacent layers of the flat and formed sectors.

As shown in FIG. 5, the formed sectors 38 are preferably arranged back to back with respect to the flat sectors 40. The plurality of welds 52 join together the sectors 38 and 40 at their points of contact. The sectors 38 and 40 are similarily joined by welds 54 to the mounting portions 56 of hub segments 58.

Figure 6:
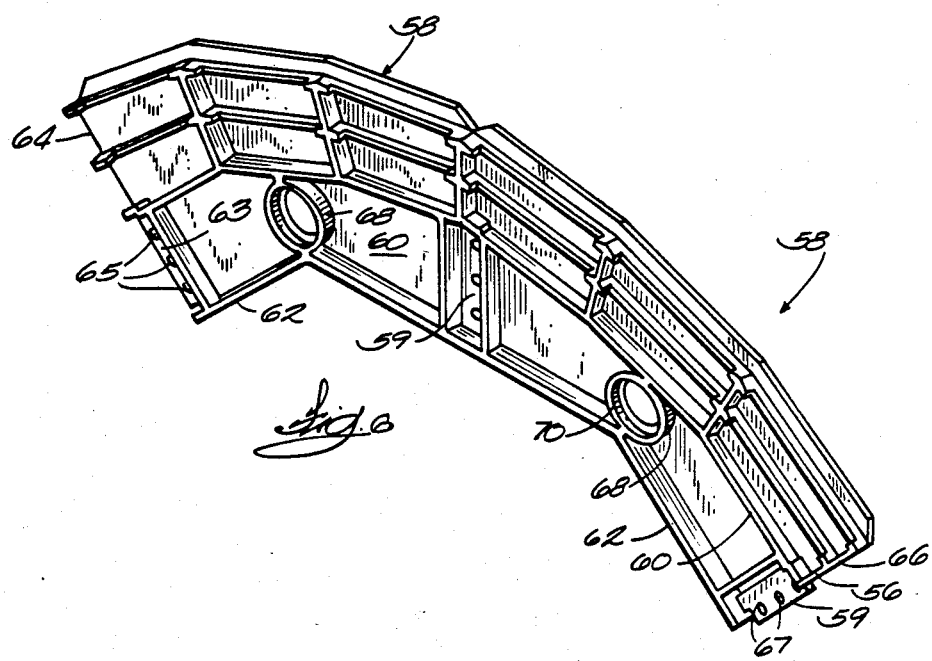
FIG. 6 is a view in perspective of a pair of identical hub segments shown joined together end to end.
Figure 7:
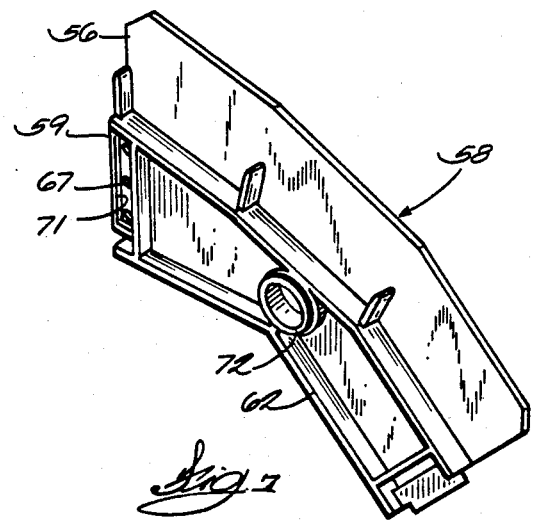
FIG. 7 is a view in perspective of a hub segment showing the side opposite to that illustrated in FIG. 6.

Referring now to FIGS. 6 and 7, in the preferred embodiment there are a series of eight identical hub segments 58, one for each of the apexes or corners of the polygonal shaft 18, which in the preferred embodiment is octagonal, although hex-shaped or square shafts are also acceptable. Each of the hub segments 58 includes a flat medial wall 60 which extends outwardly from an inner flange 62 in a plane normal to the axis of the shaft 18. The inner flange 62 is formed with an angle which corresponds to the excluded angle of the octagon shaped shaft 18 so that the flange has an inner profile complimentary to one corner of shaft 18. The inner flange 62 projects laterally from the sides of the medial wall 60. The left and right edges 64 and 66, respectively, of the segments extend generally along lines perpendicular to the inner flange 62 at positions which correspond to the mid points of the side of shaft 18. Adjacent hub segments 58 are joined along edges 64 and 66 by a plurality of mounting lugs 65 and corresponding mounting apertures 67. The lugs 65 extend from a raised rectangular platform 63—which is shaped to be nestled into the rectangular recess 71 on the backside of the first joint portion 59 of an adjacent hub segment. In that position, the lugs 65 are received within the apertures 67. Hub segments 58 are thereby joined into a ring about the shaft 18, with the lugs 65 of each segment being received in the apertures 67 of the adjacent segment.

A circular cylindrical boss 68 is formed in each hub segment 58 at the apex of the inner flange 62. The boss 68 has a short counterbore 70 formed at one end and a mating flange 72 of reduced diameter extending outwardly of the other end of the boss 68. The flange 72 of the boss 68 of one segment 58 is received within the counterbore 70 of the adjacent hub segment. In this manner, the hub segments of adjacent hub rings will register with each other.

Again to review the operation of the present invention, an oxygen containing gas, preferably air, is pressurized and fed through rotational gas conduit 30. As the air enters the wastewater in tank 12, it forms bubbles which migrate upward toward RBC media 11. Since rotational conduit 30 is positioned off the vertical center 83 of media 11, the upwardly migrating bubbles exert a rotational force and momentum on media 11 due to buoyant forces, frictional and momentum, interacting between the rising air/water mixture and the media. The deeply submerged state of the RBC greatly reduces the required rotational energy, for it has been found that as submergence increases, the required torque for rotation decreases exponentially.

Once the upwardly migrating gas bubbles are intercepted by the rotating radial passageways 39, they are dispersed throughout the network of passageways formed by the media 11 where the attached biomass is able to extract and absorb the available oxygen. It is critical for proper oxidation of organic materials in the wastewater that there be sufficient oxygen available and that the biofilm be maintained sufficiently thin so that the oxygen can diffuse throughout its depth. Penetration of the air/water mixture, at reasonable velocity through the inner, fully submerged regions of the media is necessary to accomplish this. Penetration of the air is partly determined by the amount of air emitted by the rotational gas conduit 30 and the resulting rotational velocity of the media. Too great a velocity will prevent air from reaching the center portions of media 11.

In conventional air driven, partially submerged RBCs, if the rotational velocity of the RBC is too great, the operator merely has to decrease the flow of air through conduit 30. However, in the case of the present deeply submerged RBC, a significant reduction in the flow of air in this manner could drastically affect the supply of oxygen, mixing and biofilm control in the inner regions of the media which depend on this supplemental air supply.

Furthermore, previous practice in the use of pressurized aeration of conventionally submerged media has resulted in the optimum location of the rotational gas conduit 30 between bottom center 83 and a one to two foot displacement from center in the direction of the media rotation. This has generally been the preferred location for purposes of maximum aeration effectiveness in the conventionally submerged media and the best location to discharge air into air capture devices to cause rotation of the media.

In the deep submergence configuration, due to the reduced energy required for rotation, the discharge of air only in this region may cause the RBC unit to rotate at too high a velocity. If the media rotates at too high a velocity, then the extent to which air can rise into and be effective in the constantly submerged media is severely limited. This is especially the case as the diameter of the media is increased to diameters of 16 feet and greater.

It has been found that a unique combination of air supply headers can best resolve this problem. By discharging a supply of supplemental air from an aeration conduit 74 located beneath the media on the down-rotation side 100 of the RBC center line 83, discharged air can be used both to retard the rate of rotation while at the same time entering the media sooner in the rotation cycle. This earlier media entrance time will allow air to penetrate further into the inner region of the media than can air provided by conduit 30. FIG. 3 depicts the flow of air bubbles 99 from conduit 74 through the central portion of RBC 10.

In the preferred embodiment, aeration conduit 74 is mounted on the opposite side of the center line 83 from rotational gas conduit 30. Aeration conduit 74 is connected to a gas line 29b running to blower 34. Air flow to conduit 74 is controlled by a separate control valve means 76; however, a separate gas line to aeration conduit 74 from blower 34 would not detract from the spirit of the present invention. The underside of aeration conduit 74 is fitted with a plurality of spatially arranged orifices 32 in the same manner as rotational gas conduit 30, although other conventional diffuser configurations may be used.

The principal difference between the respective conduits 30 and 74 is that aeration conduit 74 is located on the down rotation side 100 of the RBC center line 83, while the rotational conduit 30 is located from bottom center to some displacement on the upward rotational side 102 of the RBC center line 83. This arrangement is based on the finding that RBC rotational velocity is more efficiently enhanced by locating the rotational conduit on the upward rotational side 102.

Depending on the relative amounts of gas supplied to the respective conduits, a satisfactory braking effect on RBC 10 may be obtained by positioning aeration conduit 74 in any location on the down rotation side 100, up to and including the above-identified vertical center line. Since the relative amounts of air supplied to conduits 30 and 74 is a factor in determining RBC rotational velocity and aeration, valve means 76 is used to more accurately control the counteracting effect of conduits 30 and 74 on the rotational velocity and ultimately the distribution of gas within RBC media 11. Additional valve means 78 may be provided for the control of air to conduit 30. Valve means 76 and 78 may be adjusted to speed up, slow, or even reverse the rotational velocity of RBC media 11. Recent studies have shown that reversing the direction of RBC rotation is an effective method of controlling biomass buildup.

Figure 8:
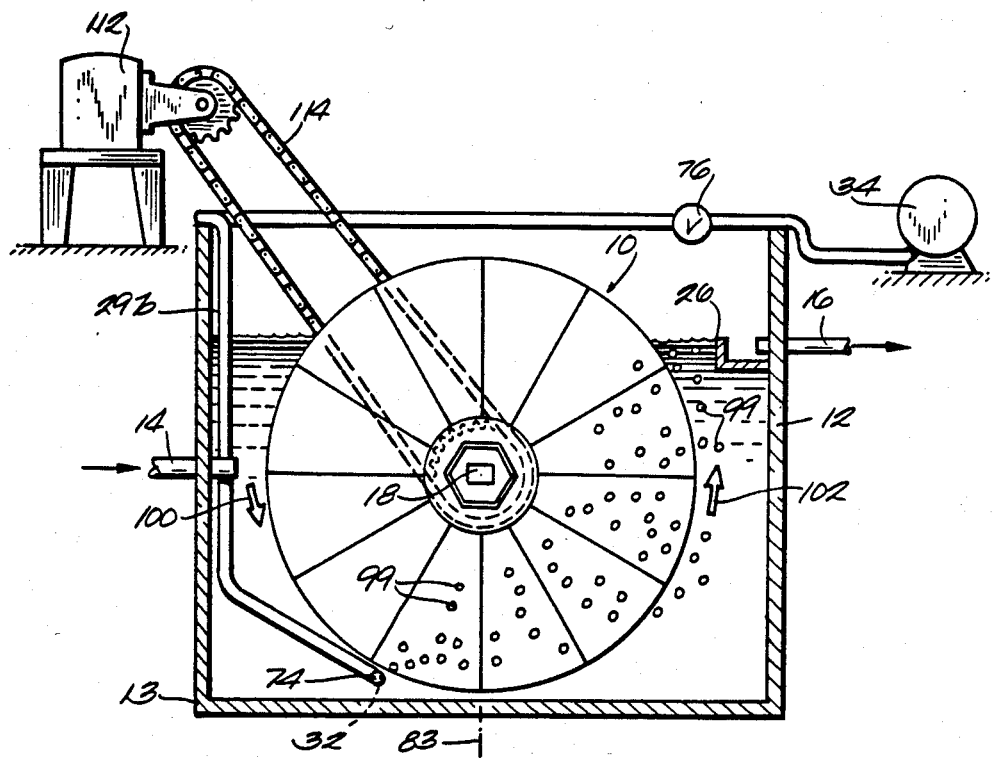
FIG. 8 is a side view in partial section of an alternate embodiment of the invention disclosed in FIG. 1.

In some applications, air driven RBCs may be undesirable or impracticable. Referring now to FIG. 8, which illustrates a deeply submerged motor driven RBC 10, the drive system comprises a motor 112 connected to RBC 10 by means of a drive chain 114 and a sprocket 116 mounted to shaft 18. Should a motor drive be substituted for air drive, conduit 30 could be eliminated as long as braking conduit 74 is positioned to allow early and sufficient penetration of air bubbles into the central region of RBC 10.

Thus, the present invention discloses a rotating biological contactor apparatus which is designed for economical, deeply submerged operation on the order from 70-100%. Installation may be inexpensively accomplished in new tankage or to upgrade existing tankage. A dual directional supplemental air drive system provides the principal source of oxygen for attached constantly submerged biota and also is able to control the rotational velocity and direction of the RBC unit to maximize air distribution and effectiveness of the media.

While a particular embodiment of the deep submergence RBC has been shown and described, it will be obvious to persons skilled in the art that changes and modifications might be made without departing from the invention in its broader aspects.

What is claimed is:

1. A biological wastewater treatment apparatus comprising:
   a treatment tank having a fluid inlet, a fluid outlet and a predetermined depth of wastewater;
   at least one generally cylindrical rotating biological contactor assembly mounted for rotation about a horizontal axis and disposed in said tank for deep submergence in the wastewater in said tank;
   said contactor assembly designed to follow a rotational cycle comprised of a downwardly directed portion followed by an upwardly directed portion;
   said contactor assembly comprised of a labyrinthine media for the attachment of biota, said media submerged in said tank to a depth such that a significant portion of said media does not rotate through the ambient air;
   a source of oxygen-containing gas under pressure;
   an aerating gas conduit leading from said source of gas into said tank and having a plurality of gas diffusers disposed beneath the length of, and in close proximity to said contactor assembly so that said gas is discharged in a stream of bubbles which rise in a generally vertical direction to intersect the outer periphery of said rotating contactor before said contactor begins the upwardly directed portion of said cycle, and then enter the media to gradually rise so that said gas bubbles are distributed throughout said rotating contactor, including said constantly submerged portion of said media to serve as the major source of aeration of said biota;
   a supplemental gas conduit disposed near the bottom of said tank, beneath the length of, and in close proximity to said contactor in the upwardly directed portion of said cycle so that the gas emanating therefrom directly intercepts said media to rotate said contactor without the use of special air collection devices; and
   means to control the flow of said gas to said diffusers.

2. The apparatus defined in claim 1 wherein said media of said rotating biological contactor assembly is submerged on the order of from 70 to 100 percent.

3. The apparatus defined in claim 1 wherein said supplemental rotational gas conduit is located beneath said rotating contactor so that the gas emanating from said conduit enters said contactor principally rotates said contactor as well as aerates said biota.

4. The apparatus defined in claim 3 wherein the submergence of said rotating contactor in said tank divides said tank into two portions on either side of a center line formed by the contactor's vertical axis, a downwardly rotating portion corresponding to the downwardly directed portion of said rotational cycle of said contactor and an upwardly rotating portion corresponding to the upwardly directed portion of said rotational cycle.

5. The apparatus defined in claim 4 wherein the flow of gas to said gas conduits may be adjusted to reverse the direction of rotation of said rotating contactor so that said aerating conduit becomes a rotating gas conduit, and said rotating gas conduit becomes an aerating conduit.

6. The apparatus defined in claim 4 wherein said rotational gas conduit and said aerating conduit are located in opposite portions of said tank.

7. The apparatus defined in claim 4 wherein said rotational gas conduit is mounted in the upwardly rotating portion of said tank.

8. The apparatus defined in claim 7 wherein said aerating gas conduit is mounted in the downwardly rotating portion of said tank, including directly on said center line.

9. The apparatus defined in claim 1 further including means to aerate wastewater in a rear of said tank not treated by said rotating contactor.

10. The apparatus defined in claim 9, wherein said aeration means comprises an additional aeration conduit.

11. The apparatus defined in claim 10, wherein said additional aeration conduit is located near the bottom of said tank between adjacent contactor units.

12. The apparatus defined in claim 9 wherein said aeration means comprises a passive structure designed to eliminate pockets of uncirculated wastewater.

13. The apparatus defined in claim 12, wherein said passive means comprises a fillet added to the bottom of said tank between adjacent contactor units.

14. A biological wastewater treatment apparatus comprising:
   a treatment tank having a fluid inlet, a fluid outlet and a predetermined depth of wastewater;
   at least one generally cylindrical rotating biological contactor assembly mounted for rotation about a horizontal axis and disposed in said tank for deep submergence in the wastewater in said tank;
   said contactor assembly designed to follow a rotational cycle comprised of a downwardly directed portion followed by an upwardly directed portion;
   said contactor assembly comprised of a labyrinthine media for the attachment of biota; said media submerged in said tank to a depth such that a significant portion of said media does not rotate through the ambient air;

a source of oxygen-containing gas under pressure;

a pair of gas conduits leading from said source of gas into said tank, and positioned in a generally widely spaced, generally parallel arrangement with the length of said contactor assembly, one conduit on either side of, and in close proximity to said contactor assembly and having a plurality of gas diffusers located in said conduits, so that said gas discharges and rises in the form of bubbles in a generally vertical direction to the outer periphery of said rotating contactor, and then enters the media as buoyant forces tend to cause the gas to rise;

means to separately control the flow of said gas to said diffusers;

said plurality of gas diffusers positioned in said tank so that said gas bubbles emitted therefrom have sufficient time and vertical movement to penetrate substantial portions of said contactor media, including said constantly submerged portion of said media; and said pressurizing gas emanating from one of said submerged conduits directly intercepting said media without the use of specialized air capture devices, as the sole source of energy needed to rotate said rotating biological contactor while said flow of gas through said media from the other of said conduits serves as the principal supply of oxygen and mixing for the effective husbandry of said biota, especially said biota which is attached to said constantly submerged portion of said media.

15. The apparatus defined in claim 14 wherein said media of said rotating biological contactor assembly is submerged on the order of from 70 to 100 percent.

16. The apparatus defined in claim 14 wherein gas emanating from the gas conduits located nearest to the upwardly directed portion of said rotational cycle of said contactor provides the principal source of rotational energy for said contactor.

17. The apparatus defined in claim 16 wherein gas emanating from the gas conduit located nearest to the downwardly rotating portion of said rotational cycle of said contactor provides the principal source of aeration for said constantly submerged portion of said contactor.

18. The apparatus defined in claim 17 wherein said flow controlling means may be adjusted to speed, slow or reverse the rotational velocity of said contactor assembly by changing the relative flow of gas to said aerating and rotational conduits.

* * * * *